No. 698,141. Patented Apr. 22, 1902.
G. ROEGNER.
CALCULATOR.
(Application filed Aug. 8, 1901.)
(No Model.) 2 Sheets—Sheet 1.
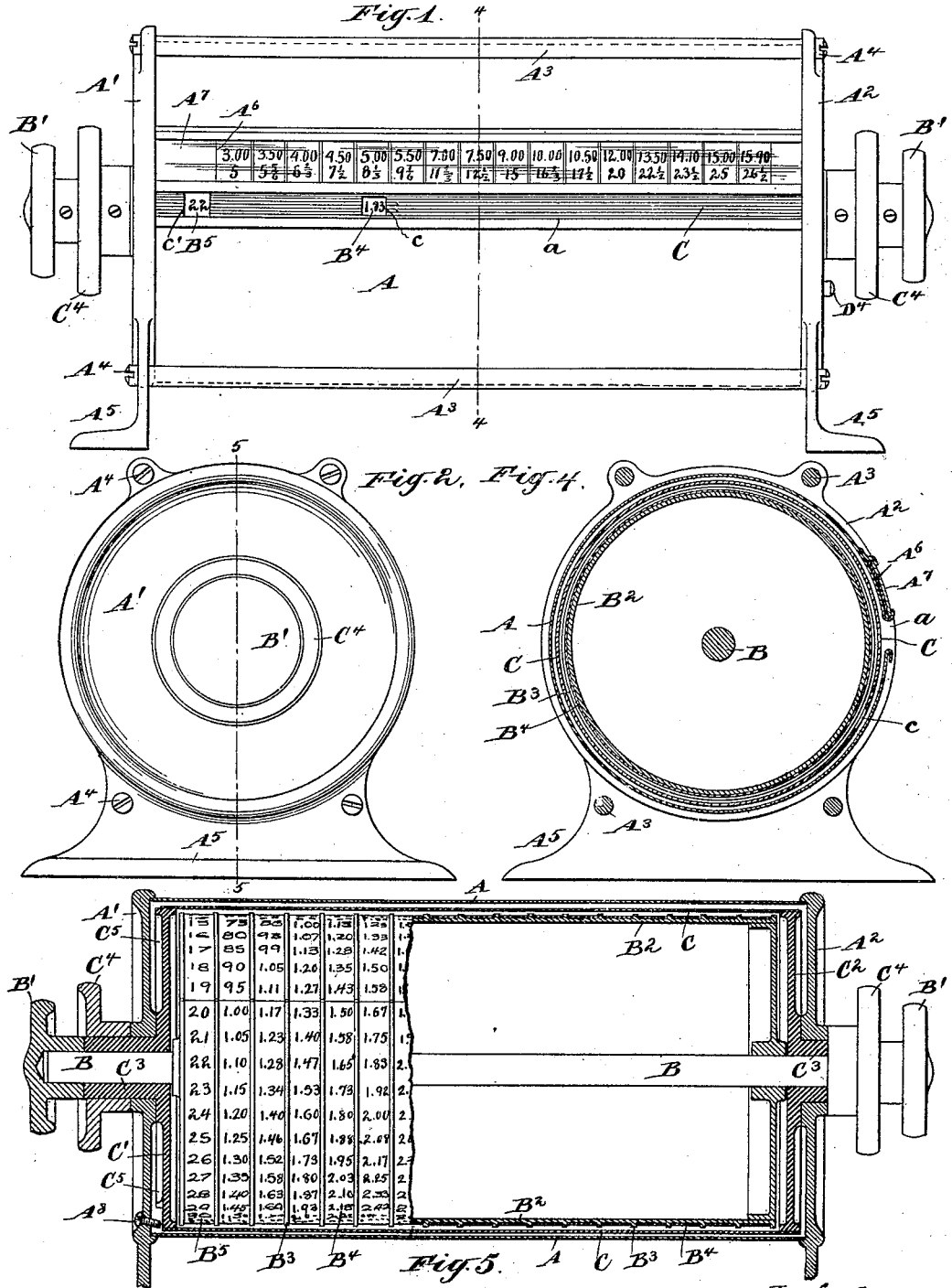

No. 698,141. Patented Apr. 22, 1902.
G. ROEGNER.
CALCULATOR.
(Application filed Aug. 8, 1901.)
(No Model.) 2 Sheets—Sheet 2.
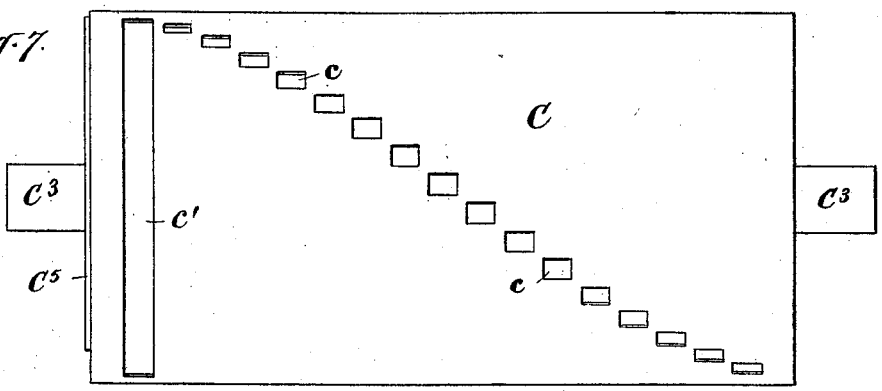
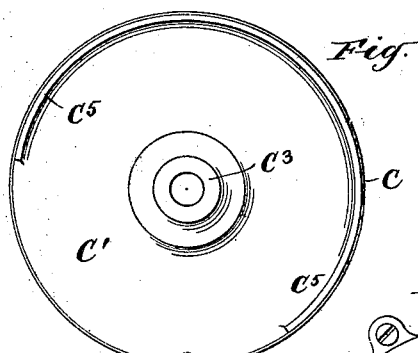
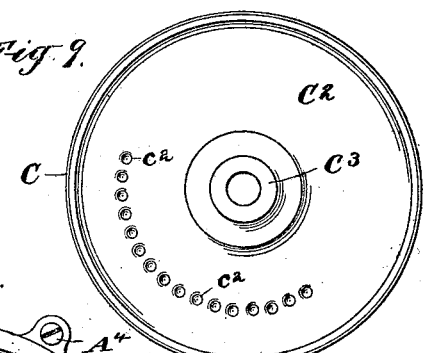
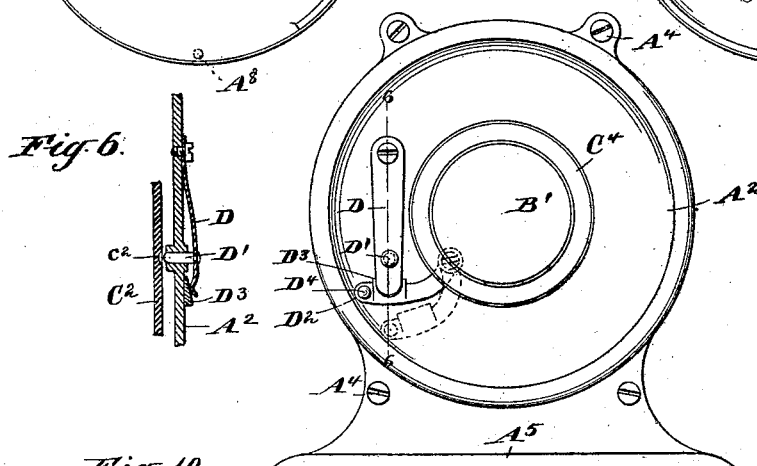
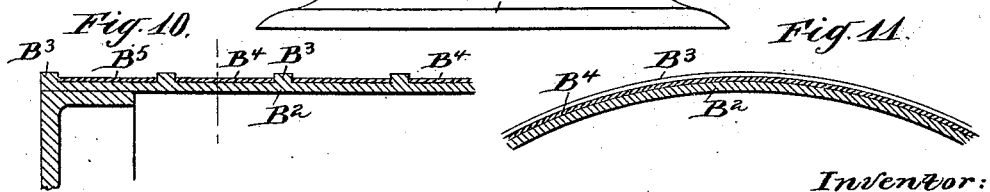
Witnesses:
M. E. Grace
W. J. Lowry.
Inventor:
George Roegner
by his attorney
Charles R. Searle.

UNITED STATES PATENT OFFICE.

GEORGE ROEGNER, OF PASSAIC, NEW JERSEY, ASSIGNOR TO THE CARLTON MANUFACTURING COMPANY, OF CARLTON HILL, NEW JERSEY, A CORPORATION OF NEW JERSEY.

CALCULATOR.

SPECIFICATION forming part of Letters Patent No. 698,141, dated April 22, 1902.

Application filed August 8, 1901. Serial No. 71,297. (No model.)

*To all whom it may concern:*

Be it known that I, GEORGE ROEGNER, a citizen of the United States, residing in Passaic, in the county of Passaic and State of New Jersey, have invented a certain new and useful Improvement in Calculators, of which the following is a specification.

The invention relates to instruments for indicating the results of various computations—as, for instance, the amount to be paid for a period of service, the rate per hour and the number of hours in the term of service being known—and belongs to that class in which the figures representing the results are arranged on a revoluble cylinder and viewed through suitable openings in the inclosing casing.

The object of the invention is to render the reading of the instrument more certain and reduce the liability of error; and it consists in certain novel features and arrangements of parts, to be hereinafter described.

The accompanying drawings form a part of this specification and show what I consider the best manner of carrying out the invention.

Figure 1 is a side view of the instrument. Fig. 2 is an elevation of one end, and Fig. 3 is a similar view of the opposite end. Fig. 4 is a transverse vertical section taken on the line 4 4 in Fig. 1; and Fig. 5 is a vertical longitudinal section, partly in elevation, the line of section being indicated by the line 5 5 in Fig. 2. Fig. 6 is a vertical section through certain portions, taken on the line 6 6 in Fig. 3. Fig. 7 is a side view of a portion detached, and Figs. 8 and 9 are corresponding end views. Fig. 10 is a longitudinal section of a portion on a larger scale, and Fig. 11 is a corresponding transverse section.

Similar letters of reference indicate the same parts in all the figures.

A is a cylindrical casing, preferably of sheet metal, having its ends received in circular recesses formed in the end plates $A'$ $A^2$ and held strongly in place between them by the tie-rods $A^3$ and screws $A^4$. Feet $A^5$, cast on the end plates, serve to support the instrument. A slot $a$ extends longitudinally of the casing at about the mid-height, and immediately above the slot is secured a slip $A^6$, bearing a series of figures representing one series of elements of the computations—in this instance the rates of wages per hour based on certain rates per week—and $A^7$ is a strip of transparent celluloid or other material serving to protect the slip, while permitting the figures to be plainly seen.

B is a shaft extending through the casing on the axial line, supported in bearings to be presently described and having on one or both overhung ends a small hand-wheel $B'$, by which the shaft may be rotated in either direction. Upon the shaft is mounted a cylindrical drum $B^2$, bearing on its outer face a series of equally-spaced circumferential ridges $B^3$, the grooves or spaces between coinciding with the positions of the series of figures on the slip $A^6$ and each carrying a strip $B^4$, upon which are figures representing the amount due for services at the rates shown upon the slip $A^6$ and for terms corresponding to the numbers of hours indicated by the numerals on the strip $B^5$ at one end of the drum (the left in Fig. 5) and forming the second element of the computations. The several strips are so arranged on the drum that the figures thereon following each number on the strip $B^5$ lie in a straight line parallel with the axis of the drum and indicate the amounts resulting from a multiplication of the number of hours by the several rates. So far as yet described the results thus arranged would show in a continuous line in the slot $a$ immediately below the slip $A^6$ and when thus presented could be read each by its adjacent rate; but such reading is liable to error by reason of the extreme care required to determine the exact figures for the rate desired, especially when the operator is fatigued by reason of using the instrument continuously for a long period. To avoid mistakes due to thus failing to distinguish the figures, I introduce the cylindrical shutter C, inclosing the drum, and with the latter inclosed within the casing A. The shutter is a closed cylinder having a slot $c'$, extending circumferentially and matching to the numerals on the strip $B^5$, and a series of small slots or openings $c$, arranged spirally and coinciding each with one of the strips $B^4$.

Each of the heads $C'$ $C^2$ of the shutter is provided with a tubular boss $C^3$, arranged on the axial line and extending through a corresponding opening in the adjacent end plate of the casing. A hand-wheel $C^4$ on one or both affords convenient means for revolving the shutter. The tubular bosses $C^3$ also inclose the shaft B and serve as bearings therefor.

In operating an instrument provided with this novel feature the shutter is rotated to bring the slot $c$, corresponding to the required rate, or one element, into coincidence with the slot $a$, directly below such rate. The drum B is then revolved until the other element (in this case the desired number of hours on the strip $B^5$) appears in the opening formed by the intersection of the slots $c'$ and $a$. In this position the required result appears in the slot $c$, and as no other result is visible there is no liability of error in reading it.

In order to hold the slot $c$ at the desired rate while finding a series of results for different numbers of hours at such rate, I provide a frictional holding means consisting, preferably, of a spring D, attached to the end plate $A^2$, bearing an inwardly-projecting pin $D'$, extending through a hole in the end plate and adapted to engage in either of a series of slight depressions or recesses $c^2$ in the head $C^2$ of the shutter. The series of recesses is arranged in a circle or arc thereof about the boss $C^3$ and is spaced to correspond with the series of slots $c$ and hold either exposed at the slot $a$, as will be understood. The engaging end of the pin $D'$ is rounded, as are also the depressions or recesses $c^2$, so that the shutter may be revolved by the application of slight force upon the hand-wheels $C^4$ sufficient to overcome the resistance offered; but to allow the shutter to revolve freely when desired I provide a lever $D^2$, pivoted to the end plate $A^2$, carrying a wedge-block $D^3$ and a handle $D^4$, by which the wedge-block may be forced beneath the upturned end of the spring D, and thus withdraw the pin $D'$ sufficiently to clear the head $C^2$ and permit the shutter to be turned unobstructedly. I prefer also to provide means for limiting the motion of the shutter in both directions. This is effected in the instrument shown by omitting a portion of an annular flange $C^5$ on the head $C'$ of the shutter and inserting a screw $A^8$ through the end plate $A'$ in the path of the flange and adapted to be struck by the ends of the latter, and thus serve as a stop to prevent further rotation when the last of the series of slots $c$ appears at the slot $a$ at either end of the series.

I attach importance to the ridges or lands $B^3$ on the drum, for the reason that they serve to protect the strips in the grooves between them from contact with the interior surface of the shutter, due to imperfect construction or to accidental change of contour of any of the parts, which otherwise might allow the strips to rub against the adjacent surface of the shutter and deface or obliterate the figures. The lands also serve an additional important function in aiding in the proper placing of the strips longitudinally and circumferentially. The longitudinal spacing is obviously determined by the lands, the strips being placed exactly between them. In arranging the strips circumferentially each is provided with a transverse line or mark $c^3$, which is placed exactly coincident with a line or series of notches $c^4$ on the lands and extending in exact parallelism with the axis. When thus placed and secured, the spacing of the figures if properly arranged on the several strips will be exact and the several lines of results corresponding to the number of hours will register exactly with the slot $a$ when turned thereto.

Modifications may be made in the forms and proportions of the parts within wide limits without departing from the principle of the invention or sacrificing its advantages. In the instrument shown provisions are made for sixteen rates and a corresponding number of results for a series of thirty-nine hours; but by varying the diameters and lengths of the parts a greater or less number of computations may be provided for.

Although I have described the invention as applied to the calculation of wages, it will be understood that it may be adapted to other computations—as, for instance, the amounts of interest due on various principals for various periods of time, the selling-prices of commodities at various prices and various weights or volumes, or in determining the commissions due on sales or the amounts due for piecework for a variety of articles at various prices.

Parts of the invention may be used without the whole. The frictional holding device for the shutter may be varied or omitted, as may also the stop for limiting the movement of the shutter. The instrument will serve successfully with a plane cylindrical drum without the lands or ridges. For the reasons above stated I prefer the construction shown.

The hand-wheels $B'$ and $C^4$ may be omitted from one end or a wheel at one end may operate the drum and a wheel at the opposite end operate the shutter.

The flange $C^5$, serving with the stop $A^8$, may be on the same head with the recesses $c^2$.

Other means than the lines $c^3$ and $c^4$ on the strips and lands may be provided for determining the exact positions, or such guides may be omitted and the figures applied to the drum in any preferred manner.

I claim—

1. In an instrument of the character set forth, the combination of a fixed casing, a drum revoluble within the same, and a cylindrical shutter revolubly interposed between the two and having spirally-arranged slots, and connections from said drum and shutter respectively to the exterior of said casing whereby said drum and shutter may be revolved independently of and relatively to each other in either direction, as set forth.

2. In an instrument of the character described, the combination of a cylindrical drum, a casing having an opening through which portions of said drum may be exposed, and a cylindrical shutter inclosing said drum and inclosed with the latter in said casing, the said shutter having a series of slots arranged to register but one at a time with said opening and expose the desired portion of the drum and conceal the remainder and an additional practically continuous slot, and means for rotating said drum and shutter within the casing, substantially as described.

3. In an instrument of the character set forth, the combination of a drum, a casing having a continuous longitudinal opening through which a portion of said drum may be exposed, and a shutter mounted to revolve in said casing and over said drum and having openings adapted to register but one at a time with said opening in the casing to expose the coincident portion of the drum and having provision for practically continuous exposure of a circumferential portion of the drum, substantially as described.

4. In an instrument of the character set forth, the combination of a cylindrical drum, a casing having an opening through which a portion of said drum may be exposed, a cylindrical shutter inclosing said drum and inclosed with the latter in said casing, means for rotating said drum and shutter independently within said casing, the said shutter having a series of slots adapted to register but one at a time with said opening and expose the desired portion of the drum and conceal the remainder, and an additional practically continuous slot, and means for holding said shutter against rotation when desired, substantially as described.

5. In an instrument of the character set forth, the combination of a cylindrical drum, a casing having an opening through which the desired portion of said drum may be exposed, a cylindrical shutter inclosing said drum and inclosed with the latter in said casing, said shutter having a series of slots adapted to register but one at a time with said opening and expose the desired portion of the drum and an additional practically continuous slot for exposing another portion of the drum, means for rotating said drum and shutter independently, means for holding said shutter against rotation when desired, and means for limiting such rotation in either direction, as set forth.

6. In an instrument of the character set forth, a casing having a longitudinally-extending opening and a cylindrical drum, in combination with a cylindrical shutter inclosing said drum and inclosed with the latter in said casing, the said shutter having a slot matching to a circumferential portion of said drum and a series of spirally-arranged slots but one slot coinciding with the longitudinal opening at a time and each matching to the desired portion of the drum, the said slots adapted to register with said opening and allow an element of computation on said drum and the result of the desired computation to be read adjacent to the element of computation on said casing, all substantially as herein specified.

7. In an instrument of the character set forth, a casing, a drum inclosed therein, a series of circumferential ridges on said drum, and a series of relatively independent figure-bearing strips secured in the grooves between said ridges and protected by the latter, marks on said ridges and corresponding marks on said strips to aid in properly locating said strips on said drum, and means for rotating said drum within said casing and exposing said figures to sight in an opening therein, all combined substantially as herein specified.

8. The casing A having the opening $a$ and end plates $A'$ $A^2$, shutter C having heads $C'$ $C^2$ thereon and tubular extensions $C^3$ passing through said end plates, and the circumferential slots $c'$ and spirally-arranged slots $c$, the shaft B passing through said extensions, the drum $B^2$ on said shaft and inclosed in said shutter, and means for rotating the latter and said drum, all combined substantially as herein specified.

9. The combination of casing A having the opening $a$ and end plates $A'$ $A^2$, shutter C and its heads $C'$ $C^2$ inclosed in said casing, said shutter having the circumferential slot $c'$ and slots $c$, the latter being spirally arranged so that only one of the same will be exposed at a time through the casing-opening, the others being masked by said casing, drum $B^2$ inclosed within said shutter, and means for rotating said drum and shutter independently, one of said shutter-heads having a series of recesses, and means on the adjacent end plate to engage frictionally with said recesses, substantially as specified.

10. The casing A having the opening $a$ and end plates $A'$ $A^2$, shutter C having the circumferential slot $c'$ and spirally-arranged slots $c$ and heads $C'$ $C^2$ inclosed in said casing, drum $B^2$ inclosed in said shutter, and means for rotating said drum and shutter independently, in combination with a series of recesses $c^2$ in one of said heads, a spring D on the adjacent end plate carrying a pin $D'$ extending through said end plate and adapted to engage frictionally with said recesses, and means as the lever $D^2$ and wedge-block $D^3$ thereon for withdrawing said pin when desired, all substantially as herein specified.

11. The casing A having the opening $a$ and end plates $A'$ $A^2$, shutter C having the circumferential slot $c'$ and spirally-arranged slots $c$ and heads $C'$ $C^2$ inclosed in said casing, drum $B^2$ inclosed in said shutter, and means for rotating said drum and shutter independently, in combination with a flange $C^5$ on one of said heads, and a stop $A^8$ set in the adjacent end plate and serving with said flange to limit the movement of said shutter, all substantially as herein specified.

In testimony that I claim the invention above set forth I affix my signature in presence of two witnesses.

GEORGE ROEGNER.

Witnesses:
CHARLES R. SEARLE,
JOHN G. N. BELL.